(12) United States Patent  
Krepec (10) Patent No.: US 9,317,130 B2  
(45) Date of Patent: Apr. 19, 2016

(54) VISUAL FEEDBACK BY IDENTIFYING ANATOMICAL FEATURES OF A HAND

(76) Inventor: Rafal Jan Krepec, Montreal (CA)

( * ) Notice: Subject to any disclaimer, the term of this patent is extended or adjusted under 35 U.S.C. 154(b) by 35 days.

(21) Appl. No.: 14/404,468

(22) PCT Filed: Jun. 18, 2012

(86) PCT No.: PCT/CA2012/000598  
§ 371 (c)(1),  
(2), (4) Date: Nov. 27, 2014

(87) PCT Pub. No.: WO2012/171116  
PCT Pub. Date: Dec. 20, 2012

(65) Prior Publication Data  
US 2015/0153832 A1    Jun. 4, 2015

(51) Int. Cl.  
*G06F 3/033* (2013.01)  
*G06F 3/01* (2006.01)

(52) U.S. Cl.  
CPC ................ *G06F 3/017* (2013.01); *G06F 3/033* (2013.01)

(58) Field of Classification Search  
CPC ........... G06F 3/01; G06F 3/033; G06F 3/017; G06F 3/0425; G09G 2340/125; G09G 5/08  
USPC ..................... 345/156–183; 178/18.01–18.09, 178/20.01–20.04  
See application file for complete search history.

(56) References Cited

U.S. PATENT DOCUMENTS

| 5,311,207 | A | 5/1994 | Kusumoto et al. |
| 5,511,148 | A | 4/1996 | Wellner |
| 5,594,469 | A | 1/1997 | Freeman et al. |
| 5,680,636 | A | 10/1997 | Levine et al. |
| 5,736,687 | A * | 4/1998 | Sellers .................... G06F 3/041 178/18.03 |
| 6,043,805 | A | 3/2000 | Hsieh |
| 6,600,475 | B2 | 7/2003 | Gutta et al. |
| 6,930,685 | B1 | 8/2005 | Sakagawa et al. |
| 7,176,881 | B2 * | 2/2007 | Nishimura ............ G06F 3/0304 345/156 |
| 7,176,890 | B2 * | 2/2007 | Kitaguchi ............. G06F 1/1601 345/158 |
| 7,808,540 | B2 | 10/2010 | Cok |
| 7,969,409 | B2 * | 6/2011 | Krepec ................. G06F 3/0425 345/156 |

(Continued)

FOREIGN PATENT DOCUMENTS

| WO | 2009110951 A1 | 9/2009 |
| WO | 2010148155 A2 | 12/2010 |

OTHER PUBLICATIONS

Entire prosecution history of U.S. Pat. No. 7,969,409 in the name of Rafal Krepec issued Jun. 28, 2011.

*Primary Examiner* — Vijay Shankar (57) ABSTRACT

A method (62) for providing visual feedback to a user having a hand (14) and operating a graphical user interface (28) on a display (24) using an input device (10). The input device (10) includes an image sensor (46) and an input element (40) defining an input surface (42), the input element (40) being at least partially transparent. The method (62) includes: with the hand (14) substantially adjacent to the input element (40), acquiring a hand image of the hand (14) through the input element (40) using the image sensor (46); identifying predetermined anatomical features (13) in the hand image and associate with each a corresponding feature location indicative of a position of the predetermined anatomical features (13) relative to the input surface (40); and displaying cursors (34, 61) in a window (30) of the graphical user interface (28) at positions relative to the window (30) that correspond to the feature locations relative to the input surface (40).

36 Claims, 3 Drawing Sheets

(56) References Cited

U.S. PATENT DOCUMENTS

| | | |
|---|---|---|
| 2002/0140667 A1 | 10/2002 | Horiki |
| 2004/0032398 A1 | 2/2004 | Ariel et al. |
| 2004/0095318 A1 | 5/2004 | Morrison et al. |
| 2008/0029691 A1 | 2/2008 | Han et al. |
| 2010/0045611 A1 | 2/2010 | Nelson et al. |

* cited by examiner

VISUAL FEEDBACK BY IDENTIFYING ANATOMICAL FEATURES OF A HAND

FIELD OF THE INVENTION

This invention relates to the field of computer user interface. More particularly, the invention relates to a method for providing visual feedback to a user operating a graphical user interface, to a system for performing same and an input device usable in the system.

BACKGROUND OF THE INVENTION

Multi-touch input devices for computing devices, such as personal computers, and computing devices incorporating such input devices, such as tablet computers and smart phones, are popular as they allow more versatile inputs to the computing device than conventional graphic tablets, mouse devices, trackpads and trackballs with relatively simple and comparatively constraining movements. Typically, the touch and/or multitouch input device detects positions at which a user touches an input surface. These positions are conveyed to the computing device, which in turns accepts and performs a user input function and/or displays a cursor or any other suitable graphic element on a display, with the position of the cursors corresponding to the positions at which the user touches the surface. In multi-touch devices, many other actions are also associated with different contact patterns with the input surface.

One of the problems that occurs when using these devices is that the user often looks at a display, such as a computer monitor, that is distanced from and oriented differently than the input device. Therefore, the user can lose track of the location of fingers used to operate the input device when the fingers are lifted from the input device, either voluntarily to be relocated at a different location, or involuntarily by accident.

Also a types of devices that are becoming popular are the tablet computer and the smart phone. A tablet computer or a smart phone is a typically relatively thin rectangular shaped device in which the display occupies most of one side thereof. The display is touch sensitive and therefore provides means for controlling a graphical user interface. For casual text entry, a virtual keyboard can be displayed on the display to allow typing. However, when a user wishes to enter large amounts of text, the use of the virtual keyboard can become tiring. Also, to facilitate typing, the display is typically disposed horizontally on a surface. This forces the user to bend his head to see the display, which can cause strain in the neck of the user.

A solution to these problems is to connect a physical keyboard and an external display to the tablet computer or the smart phone so that the setup for data entry and visualization can be similar to the more ergonomic setup of a conventional computer workstation. The connection can be made by plugging directly or by wireless means the keyboard and display to the tablet or the smart phone or through the use of a docking station. However, the user then loses sight of the tablet or smart phone display, which can make operation of the graphical user interface more difficult. An external pointing device, such as a mouse can be used, but the user then loses the many advantages of the touch screen input versatility, such as the correspondence between a location of fingers adjacent the screen and the position at which an action is taken on the screen in the graphical user interface. Another advantage of the tablet computer or the smart phone that is lost with the use of a mouse or a similar device is the multi-touch capability.

Against this background, there exists a need in the industry to provide an improved input device, system and method for using a graphical user interface.

An object of the present invention is therefore to provide an improved input device, system and method.

SUMMARY OF THE INVENTION

In a broad aspect, the invention provides a method for providing visual feedback to a user operating a graphical user interface on a display using an input device, the user having a hand, the hand defining predetermined anatomical features, the input device including an image sensor and an input element defining an input surface, the input element being at least partially transparent, the graphical user interface including a window. The method includes: with the hand substantially adjacent to the input element, acquiring a hand image of the hand through the input element using the image sensor; processing the hand image to identify the predetermined anatomical features in the hand image and associate with each of the predetermined anatomical features a corresponding feature location, the feature locations being indicative of a position of the predetermined anatomical features relative to the input surface; processing the hand image to derive a processed hand image, the processed hand image preserving a shape and orientation of the hand in the hand image; overlaying on the display the processed hand image in a manner such that the position and orientation of the processed hand image relative to the window corresponds to the position and orientation of the hand relative to the input surface; displaying cursors in the window, the cursors being each associated with a corresponding ones of the predetermined anatomical features, the cursors being positioned so that the position of the cursors relative to the window corresponds to the feature locations relative to the input surface.

The proposed method therefore preserves proportions and spatial relationships between the physical world in which the hand of the user evolves and the virtual world that is acted upon by the intended user. Image acquisition is performed by looking through the input surface, or in other words from "below" the hand. Acquiring the image of the hand in this manner eliminates the need for an external camera. Also, detection of contact between the hand and the input surface, and in general identification of the predetermined anatomical features in the hand image, are in some cases enabled as in for example for the detection of a gentle touch by the user and in some other cases facilitated and more precise when compared to a situation in which the hand image would be acquired from above the hand. Another case enabled by this invention is the consistent and precise tracking of a stylus end point which is not always possible when capturing the image from above the hand with a camera. Most often times the average user writes in a natural manner as accustomed to writing on a piece of paper, by holding the stylus so that the stylus end point would not always be visible to a camera view when the camera is located above the input surface. The user's fingers and other parts of his hand will often times obstruct the view of a camera located above the input surface, from capturing the end point of the stylus. Indeed, in the present invention, the hand image is acquired from a location that clearly shows the predetermined anatomical features as they look from close to the input surface. Since this is the information that is important to the user as the input surface is the surface used to interact with the graphical user interface, correct identification and location of the predetermined anatomical features or of the stylus end point is enabled and facilitated.

Advantageously, the proposed method provides feedback to the intended user regarding the position, shape and configuration of the hand and of parts thereof.

The hand is either entirely spaced apart from the input surface, or at least one of the predetermined anatomical features is spaced apart from the input surface. In some embodiments of the invention, in this latter case, the graphical user interface includes an object, the object being substantially adjacent to the cursor to which the at least one of the predetermined anatomical features is associated, the method further comprising highlighting the object.

In some embodiments of the invention, at least one of the predetermined anatomical features contacts the input surface and the method further comprises processing the hand image to detect that the at least one of the predetermined anatomical features contacts the input surface.

In some embodiments of the invention, the input device includes a light source, the method further comprising illuminating the hand with the light source through the input element.

In some embodiments of the invention, the input element is contact sensitive and the hand contacts the input surface at a contact location, the method further comprising detecting the contact location and displaying an alternative cursor in the window at an alternative cursor location, the alternative cursor being positioned so that the alternative cursor location relative to the window corresponds to the contact location relative to the input surface.

In some embodiments of the invention, the input element is contact sensitive and the hand contacts the input surface at a contact location, the method further comprising detecting the contact location and transmitting to the graphical input interface the contact location.

In some embodiments of the invention, the predetermined anatomical features include fingertips, the feature locations of the fingertips being a centroid of the fingertips in the hand image.

In some embodiments of the invention, the processed hand image is an image of the hand processed to remove pixels outside of the hand in the hand image. In other embodiments of the invention, the processed hand image includes a contour of the hand extracted from the hand image.

In some embodiments of the invention, the hand holds a stylus defining a stylus end point, the method further comprising processing the hand image to identify the stylus end point in the hand image and associate with the stylus end point a stylus location, the stylus location being indicative of a position of the stylus end point relative to the input surface; and displaying an alternative cursor in the window, the alternative cursor being positioned so that the position of the alternative cursor relative to the window corresponds to the location of the stylus end point relative to the input surface.

In some embodiments of the invention, the anatomical feature location is a tridimensional location and the cursors are configured to indicate a distance between the input surface and each of the predetermined anatomical features.

In some embodiments of the invention, the window comprises dimensions substantially the same as the display. In other embodiments of the invention, the window comprises dimensions less than the display.

In some embodiments of the invention, the window comprises at least one sub-window. In these embodiments, in some cases, the processed hand image and the cursors are displayed only when at least one of the cursors is within at least one of the at least one sub-window.

In some embodiments of the invention, displaying the processed hand image includes mixing the processed hand image with an other image in the window. For example, the other image includes parts of the graphical user interface. In some embodiments of the invention, mixing the processed hand image with the other image includes selectively adjusting a translucence of the processed hand image such that when the processed hand image overlays a fraction of the other image, the fraction can still be seen through the processed hand image.

In some embodiments of the invention, the input surface is part of a secondary display, the method further comprising displaying the cursors on the secondary display in register with the predetermined anatomical features.

In some embodiments of the invention, the hand image includes an array of pixels and the image sensor includes an array of sensing elements provided substantially adjacent to the input surface with the input surface being provided between the image sensor and the hand, the array of sensing elements being dimensioned substantially similarly to the input surface, each of the sensing elements providing one of the pixels.

In another broad aspect, the invention provides a system usable by an intended user having a hand to operate a graphical user interface, the hand defining predetermined anatomical features, the graphical user interface including a window, the system comprising: a display; an input device, the input device including an input element defining an input surface and an opposed undersurface, the input element being at least partially transparent; and an image sensor configured located and operative for capturing a hand image of the hand through the input element when the hand is located substantially adjacent to the input surface and either entirely spaced apart therefrom or contacting the input surface. The system also includes an image processor coupled to the image sensor and operative for receiving the hand image from the image sensor and for processing the hand image to identify the predetermined anatomical features of the hand in the hand image and associate with each of the predetermined anatomical features a corresponding feature location, the feature locations being indicative of positions of the predetermined anatomical features relative to the input surface; and a display interface coupled to the image processor and to the display and operative for displaying on the display the window and displaying cursors in the window, the cursors being each associated with a corresponding ones of the predetermined anatomical features, the cursors being positioned so that the position of the cursors relative to the window corresponds to the feature locations relative to the input surface.

In some embodiments of the invention, the image sensor includes an array of imaging elements, for example near field semiconductor light detection elements such as complementary metal oxide semiconductor (CMOS) imaging elements, provided substantially adjacent to the undersurface, the undersurface being provided between the image sensor and the input surface. For example, the hand image includes an array of pixels, each of the pixels being acquired by a respective one of the imaging elements. In a specific example, the array of imaging elements and the input surface have substantially similar dimensions.

In some embodiments of the invention, the image processor is further operative for processing the hand image to derive a processed hand image therefrom, the processed hand image preserving a shape and orientation of the hand image; an the display interface is operative for overlaying on the display the processed hand image in a manner such that the position and orientation of the processed hand image relative to the window corresponds to the position and orientation of the hand relative to the input surface.

In some embodiments of the invention, the display and the input surface have different spatial orientations. For example the display and the input surface are substantially perpendicular to each other, such as is the case when the display is substantially vertical and the input surface is substantially horizontal.

In some embodiments of the invention, the input surface is contact sensitive and the input element is operative for providing contact coordinates indicative of a contact location at which the hand contacts the input surface, the display interface being operative for receiving the contact location and displaying an alternative cursor in the window at an alternative cursor location, the alternative cursor being positioned so that the alternative cursor location relative to the window corresponds to the contact location relative to the input surface.

In some embodiments of the invention, the input element is contact sensitive and the hand contacts the input surface at a contact location, the input element being operative for providing contact coordinates indicative of the contact location to the graphical user interface.

In some embodiments of the invention, the input element detects contact by a detection method selected from the group consisting of a capacitive contact detection method, a resistive contact detection method, a detection method using surface acoustic waves, an infrared contact detection method, an optical imaging contact detection method, a dispersive signal technology detection method and an acoustic pulse recognition method.

In some embodiments of the invention, the system further comprises a stylus defining a stylus end point, the stylus being graspable by the hand, the input surface being contact sensitive and the input element being operative for providing contact coordinates indicative of a contact location at which the stylus end point contacts the input surface, the display interface being operative for receiving the contact location and displaying an alternative cursor in the window at an alternative cursor location, the alternative cursor being positioned so that the alternative cursor location relative to the window corresponds to the contact location relative to the input surface.

In some embodiments of the invention, the system further comprises a stylus defining a stylus end point, the stylus being graspable by the hand, the input element being contact sensitive for sensing a contact location at which the stylus end point contacts the input surface, the input element being further operative for providing contact coordinates indicative of the contact location to the graphical user interface.

In some embodiments of the invention, the input device further comprises an input device display substantially in register with the input surface, the display interface being operative for displaying the window on the input device display.

In some embodiments of the invention, the input element is entirely transparent in register with the image sensor.

In some embodiments of the invention, the image processor is operative for classifying the predetermined anatomical features as either contacting the input element or being spaced apart therefrom. In some of these embodiments, the graphical user interface includes an object and the image processor is operative for highlighting the object if at least one of the cursors is substantially adjacent thereto, the at least one of the cursors being associated with one of the predetermined anatomical features that is spaced apart from the input surface.

In another broad aspect, the invention provides an input device usable with a computing device by an intended user having a hand, the input device comprising: an input element defining an input surface and an opposed undersurface, the input element being at least partially transparent; an image sensor for capturing through the input element a hand image of the hand when the hand is located substantially adjacent to the input surface and either entirely spaced apart therefrom or contacting the input surface; and an input device interface couplable to the computing device and operative for transmitting to the computing device image information obtained from the hand image.

In some embodiments of the invention, the image information includes an unprocessed version of the hand image.

In some embodiments of the invention, an image processor is coupled to the image sensor and to the input device interface and operative for receiving the hand image from the image sensor; processing the hand image to compute the image information; and releasing the image information to the input device interface.

In some embodiments of the invention, the image information includes a contour of the hand in the hand image. In other embodiments of the invention, the hand defines at least one predetermined anatomical feature, the image processor being operative for receiving the hand image from the image sensor and for processing the hand image to identify the at least one predetermined anatomical feature of the hand in the hand image and associate with the at least one predetermined anatomical features a feature location, the feature location being indicative of a position of the at least one predetermined anatomical feature relative to the input surface; and the image information includes the feature location.

In some embodiments of the invention, the image processor is also operative for classifying the predetermined anatomical features as either contacting the input element or being spaced apart therefrom, the image information including an indication of whether each of the predetermined anatomical feature contacts or is spaced apart from the input element.

In some embodiments of the invention, the hand defines at least two predetermined anatomical features, the image processor being operative for receiving the hand image from the image sensor and for processing the hand image to identify the at least two predetermined anatomical features of the hand in the hand image and associate with each of the at least two predetermined anatomical features a corresponding feature location, the feature locations being indicative of a position of the at least two predetermined anatomical features relative to the input surface; and the image information includes the feature locations.

In some embodiments of the invention, the image sensor includes an array of imaging elements provided substantially adjacent to the undersurface, the undersurface being provided between the image sensor and the input surface. For example, the hand image includes an array of pixels, each of the pixels being acquired by a respective one of the imaging elements. In a very specific example, the array of imaging elements and the input surface have substantially similar dimensions. For example, the imaging elements are near field semiconductor light detection elements, such as complementary metal oxide semiconductor (CMOS) imaging elements, among others.

In some embodiments of the invention, the input surface is contact sensitive and the input element is operative for providing to the input device interface contact coordinates indicative of a contact location at which the hand contacts the input surface, the input device interface being operative for receiving the contact location and transmitting to the computing device the contact location.

In some embodiments of the invention, the contact sensitive surface detects contact by a detection method selected from the group consisting of a capacitive contact detection method, a resistive contact detection method, a detection method using surface acoustic waves, an infrared contact detection method, an optical imaging contact detection method, a dispersive signal technology detection method and an acoustic pulse recognition method.

In some embodiments of the invention, the input device is usable with a stylus held by the hand, the input surface is contact sensitive and the input element is operative for providing to the input device interface contact coordinates indicative of a contact location at which the stylus end point contacts the input surface, the input device interface being operative for receiving the contact location and transmitting to the computing device the contact location.

In some embodiments of the invention, the input device is usable with a stylus held by the hand, the input surface is contact sensitive and the input element is operative for providing to the input device interface contact coordinates indicative of contact locations at which the hand and the stylus end point contact the input surface, the input device interface being operative for receiving the contact locations and transmitting to the computing device the contact locations.

In some embodiments of the invention, the input device also comprises an input device display substantially in register with the input surface, the input device interface being operative for receiving an image from the computing device and displaying the image on the input device display.

In some embodiments of the invention, the input element is entirely transparent in register with the image sensor.

In another broad aspect, the invention provides a method for providing visual feedback to a user operating a graphical user interface on a display using an input device, the user having a hand, the hand defining predetermined anatomical features, the input device including an image sensor and an input element defining an input surface, the input element being at least partially transparent, the graphical user interface including a window, the method comprising: with the hand substantially adjacent to the input element, acquiring a hand image of the hand through the input element using the image sensor; processing the hand image to identify the predetermined anatomical features in the hand image and associate with each of the predetermined anatomical features a corresponding feature location, the feature locations being indicative of a position of the predetermined anatomical features relative to the input surface; and displaying cursors in the window, the cursors being each associated with a corresponding ones of the predetermined anatomical features, the cursors being positioned so that the position of the cursors relative to the window corresponds to the feature locations relative to the input surface.

Other objects, advantages and features of the present invention will become more apparent upon reading of the following non-restrictive description of preferred embodiments thereof, given by way of example only with reference to the accompanying drawings.

DETAILED DESCRIPTION

In the present document, many elements are described as being operative for performing a certain function. This terminology is used to designate elements that include hardware, such as electrical, electronic and integrated circuits, among other possibilities, and/or software executed by processing elements, such as central processing units, microprocessors and micro controllers, among others, and stored in memory elements, semiconductor based or other, and other components if required. All the components together perform the function. These elements are each suitably configured and coupled to each other through conductors, such as cables and traces on printed circuit boards, optical components or wireless components, among others, so that the components can perform the functions stated.

Figure 1:
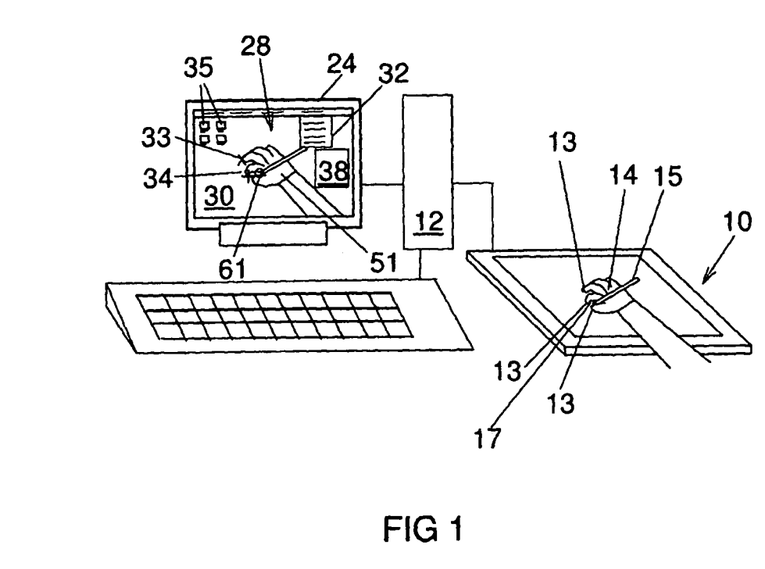
FIG. 1, in a schematic view, illustrates an input device in accordance with an embodiment of the present invention connected to a computing device.

Referring to FIG. 1, there is shown an input device usable 10 with a computing device 12 by an intended user (not entirely shown in the drawings) having a hand 14. The input device 10 is used in some embodiments to replace a conventional computer mouse, trackpad, trackball, graphic tablet or any other suitable alternative input device. However, it is within the scope of the invention to use a mouse, a trackpad, a trackball, a graphic tablet or any other suitable alternative input device along with the proposed input device 10.

The hand 14 defines predetermined anatomical features. The predetermined anatomical features are features of the hand 14 that are expected to be present in the hand 14 of all, or at least most, users of the input device 10. The predetermined anatomical features are features that are to be recognized in a hand image of the hand 14, as described in further details hereinbelow. An example of predetermined anatomical features is the fingertips 13. However, any bother suitable predetermined anatomical feature is within the scope of the invention, such as fingers, palm and wrist. A feature location is indicative of a position of each predetermined anatomical feature. The feature location locates in space the predetermined anatomical feature. For example, the feature location can locate the center of the predetermined anatomical feature.

Figure 2:
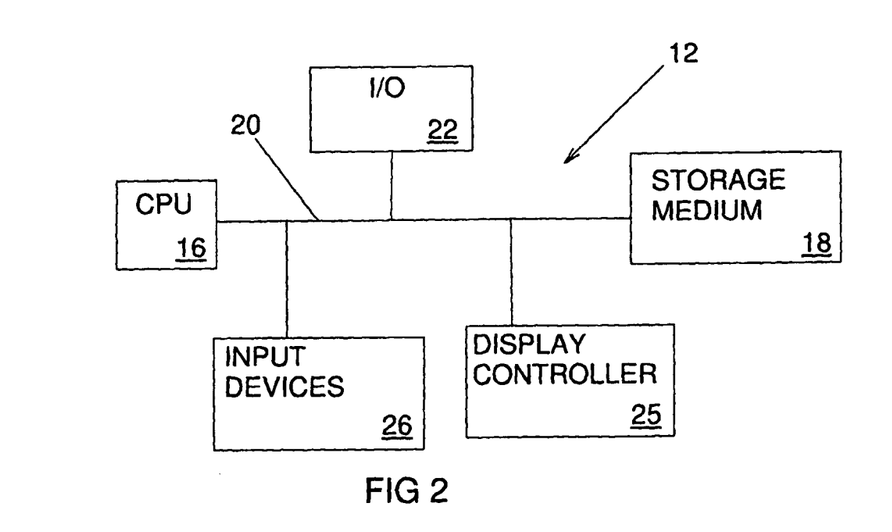
FIG. 2, in a block diagram, illustrates the computing device shown in FIG. 1.

The computing device 12 is in some embodiments of the invention a general purpose computer. However, in other embodiments of the invention, the computing device 12 can be a specialized computing device. Also, while in FIG. 1 the computing device 12 is shown as a stand-alone unit, which does not include integrated keyboard, monitor and input device, the physical format of the computing device 12 may be different and the computing device 12 may be packaged with one or more peripherals, such as a display, a keyboard and an input device, in a single device. As seen in FIG. 2, in a block diagram, in some embodiments of the invention, the computing device 12 includes a Central Processing Unit (CPU) 16 connected to a storage medium 18 over a data bus 20. Although the storage medium 18 is shown as a single block, it may include a plurality of separate components, such as a compact disc (CD) disk drive, a fixed disk, a tape drive, Flash type storage device, Read-Only Memory (ROM), and a Random Access Memory (RAM), among others. The computing device 12 also includes an Input/Output (I/O) interface 22 that connects to the data bus 20. The computing device 12 communicates with outside entities through the I/O interface 22. In a non-limiting example of implementation, the I/O interface 22 includes a network interface, a parallel port interface, a serial port interface, a Universal Serial Bus (USB) interface, a wireless interface, any combination thereof, or any other suitable interface. The I/O interface 22 is used for example to exchange data with the input device 10.

The computing device 12 also includes a display controller 25 to which is connected by wire or in a wireless way a display 24 (seen in FIG. 1). The computing device 12 further typically includes complementary input devices 26 connected by wire or in a wireless way to the computing device 12, through which the user may input data or control the operation of a program element executed by the CPU 16. The input device 26 may include, for example, any one or a combination of the following: keyboard, pointing device, touch or contact sensitive surface or speech recognition unit, among others.

In a typical implementation, the computing device 12 is executing on the CPU 16 an operating system stored on the storage medium 18 and providing a graphical user interface 28 (seen in FIG. 1). Alternatively, an operating system can be stored on a storage medium at a remote location, which operating system is executed by the CPU 16 through a network connection. The graphical user interface 28 is an interface allowing the user to operate at least some or most of the functionality of the computing device 12 using an interaction with graphics on the display 24. For example, but non-limitingly, the graphical user interface 28 includes one or more window 30, menus 32, one or more cursors 34, also called pointers, icons 35 and other conventional graphical user interface items.

The window 30 fills a region of the display 24 and often includes a visible delimiting border. Typically, the window 30 is dedicated to a purpose. For example, the window 30 may be used as an interface to interact with a computer program. In another example, a sub-window 38 is associated to the window 30 and used for a very specific purpose in the interaction with the computer program. In another example, the window 30 covers the whole display 24. In this example, the window 30 may not include the visible delimiting border. Such a window 30 is often used to allow interaction with the operating system running on the computing device 12.

A cursor 34 is an element of the graphical user interface 28 used to point out a location in the window 30. Cursors 34 can have many shapes, such as an arrow shape, a cross shape, a circle shape, or any other suitable shape. Typically, but not necessarily, a cursor 34 is shaped to convey easily the pointed out location in the window 30. Cursors 34 typically have a color and a shape that makes them relatively easily distinguished from background elements of the graphical user interface 28. In some embodiments of the invention, the color of the cursor 34 changes as the cursor 34 moves in the window 30 to facilitate distinction from background elements that do not move along with the cursor 34.

Figure 3:
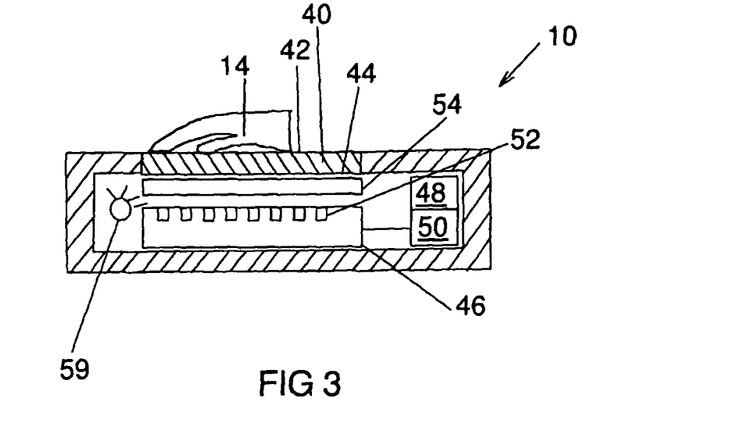
FIG. 3, in a schematic cross-sectional view, illustrates the input device shown in FIG. 1.

The input device 10 is used to capture user inputs, such as pointing, dragging, pinching, clicking and other conventional actions performed in multitouch user interfaces. Referring to FIG. 3, the input device 10 includes an input element 40, an image sensor 46 and an input device interface 48. In some embodiments of the invention, the input device 10 also includes an image processor 50.

The input element 40 defines an input surface 42 and an opposed undersurface 44. The input element 40 is at least partially transparent. The input element 40 may be entirely transparent in register with the image sensor 46, or may include an array of transparent regions. For the purpose of this document, the term transparent means that the input element 40 allows enough light to go therethrough without interfering to a great extent therewith so that a hand image of the hand 14 can be acquired by the image sensor 46 with the hand image having enough details, luminosity, contrast and sharpness to allow the identification of the predetermined anatomical features in the hand 14. The input element 40 is shown in the drawings as being of a generally rectangular plate of uniform thickness, but in alternative embodiments of the invention, the input element 40 has any other suitable shape.

The image sensor 46 is provided for capturing through the input element 40 a hand image of the hand 14 when the hand 14 is located substantially adjacent to the input surface 42 and either entirely spaced apart therefrom or contacting the input surface 42. In other words, the image sensor 46 "looks through" the input element 40 to capture the hand image. The image sensor 46 typically acquires the hand image using visible light, but infrared radiation and millimeter wavelength radiations, among other possibilities, can also be used. For the purpose of this document, the terminology substantially adjacent means a distance that the average user of a touch or contact screen device requires for a comfortable aiming distance before the user touches the surface of the touch screen.

This manner of capturing the hand image can be realized in some embodiments, as seen in FIG. 3, by having the image sensor 46 in register with the input surface 42 on the side of the input element 40 opposed to the hand 14. In these embodiments, the image sensor 46 includes an array of imaging elements 52 (with FIG. 3 only showing part of the array) provided substantially adjacent to the undersurface 44, the undersurface 44 being provided between the image sensor 46 and the input surface 42. The image sensor either contacts the undersurface 44 or is spaced apart therefrom. In some specific embodiments, the hand image includes an array of pixels, each of the pixels being acquired by a respective one of the imaging elements 52. In a very specific example, the array of imaging elements 52 and the input surface 42 have substantially similar dimensions. A type of image sensor 46 suitable for this type of input device 10 includes imaging elements 52 that are near field semiconductor light detection elements, such as complementary metal oxide semiconductor (CMOS) imaging elements.

In other embodiments, not shown in the drawings, the image sensor 46 acquires the image of the hand 14 by redirecting towards an alternatively positioned image sensor light that goes through the input element 40 using lenses, mirrors, light waveguides and other suitable optical components. These optical components can be conventional geometrical optics components or can be diffractive optical components using light diffraction to direct and focus light.

The input device interface 48 is couplable to the computing device 12 and operative for transmitting to the computing device 12 image information obtained from the hand image. The image information is information conveyed by the hand image, either with or without further processing after acquisition. The image information can for example and non-limitingly include an image, in other words an array of pixels, a vector, or 1-dimensional array, or one or more sets of coordinates, either 2D or 3D, associated or not with another quantity, either a scalar, a vector or a matrix, among other possibilities. In a very simple example, the image information includes an unprocessed version of the hand image.

When present, the image processor 50 is coupled to the image sensor 46 and to the input device interface 48 and is operative for receiving the hand image from the image sensor 46, processing the hand image to compute the image information and releasing the image information to the input device interface 48. In some embodiments of the invention, the image information includes a contour of the hand 14 in the hand image. In other embodiments, the image information includes an image of the hand 14 processed to remove pixels outside of the hand 14 in the hand image. Algorithms for processing hand images as described in this paragraph and in other paragraphs of the present document are well known in the art and will therefore not be described in further details herein.

In another example, the image processor 50 is operative for processing the hand image to identify one or more predetermined anatomical features of the hand 14 in the hand image and associate with the predetermined anatomical features a feature location. Each feature location is indicative of a position of one of the predetermined anatomical features relative to the input surface. In these cases, the image information includes the feature location. In a specific example, the predetermined anatomical features include fingertips 13 and the feature location of each the fingertip is a centroid of the fingertip in the hand image.

In yet other embodiments of the invention, the hand 14 holds a stylus 15 defining a stylus end point 17 and the image processor 50 is operative for processing the hand image to identify the stylus end point 17 and stylus end point coordinates. The image information then includes the stylus end point coordinates.

In embodiments wherein the input device 10 does not include the image processor 50, processing of the hand image as described hereinabove can be made by the computing device 12 instead of by the image processor 50.

In some embodiments of the invention, the input surface 42 is also contact sensitive for sensing either when the hand 14 touches the input surface 42 or when the stylus 15 contacts the input surface 42. Also, the input element 40 is operative for providing to the input device interface 48 contact coordinates indicative of a contact location at which contact occurs on the input surface 42. The input device interface 48 is in turn operative for receiving the contact location and transmitting to the computing device 12 the contact location. In these embodiments the input device 10 includes means other than imaging to detect contact with the input surface 42. For example, the contact sensitive input surface 42 detects contact by a detection method selected from the group consisting of a capacitive contact detection method, a resistive contact detection method, a detection method using surface acoustic waves, an infrared contact detection method, an optical imaging contact detection method, a dispersive signal technology detection method and an acoustic pulse recognition method, among other contact detection methods.

However, in alternative embodiments of the invention, contact with the input surface 42 is detected using the hand image. For example, this contact is detected by measuring the expansion of the parts of the hand 14 that touch the input surface 42, such as an expansion of the fingertips, due to the pressure exerted by the input surface 42 on the hand 14. In these embodiments, different actions can be assigned in the graphical user interface 28 to predetermined anatomical features that contact the input surface 42 and to predetermined anatomical features that are entirely spaced apart from the input surface 42, or in other words that do not contact the input surface 42. For example, objects of the graphical user interface 28, such as icons 35 for example, are highlighted in a conventional manner when the cursor location of the cursors 34 associated with predetermined anatomical features that are entirely spaced apart from the input surface 42 are substantially adjacent to the objects. In yet other embodiments, contact of the stylus 15 with the input surface 42 is detected by a light emitting device located on the tip of the stylus 15. The light emitting device will change intensity or color to be captured by the image sensor 46, depending on the pressure exerted by the input surface 42 on the tip of the stylus 15. In this embodiment the stylus 15 contains a battery and circuit with a pressure switch coupled to the light emitting device. Alternatively the tip of the stylus 15 can be made of a material which will change in size or provide a different color to be captured by the image sensor 46, depending on the pressure exerted by the input surface 42 on the tip of the stylus 15.

In some embodiments of the invention, the processed hand image 51 and the cursors 34 are displayed only when at least one of the cursors 34 is within a sub-window 38, typically the active sub-window 38. However, in other embodiments, the cursors 34 are always displayed on the display 24, as long as there is one of the predetermined anatomical feature in the hand image.

In some embodiments of the invention, the input device 10 also includes an input device display 54 substantially in register with the input surface 42. The input device interface 48 is then operative for receiving an image from the computing device 12 and displaying the image on the input device display 54. The image can be for example the image displayed on the display 24. The input device display 54 is represented in FIG. 3 as separate from the image sensor 46, which can indeed correspond to the physical configuration of the input device 10. However, in some embodiments, the input device display 54 and image sensor 46 are integrated in a single device, for example a single semiconductor device in which the imaging elements 52 are interleaved with display elements. An example of such an embodiment would occur in a case in which the image sensor 46 is integrated in the display of a tablet computer or a smart phone.

In some embodiments of the invention, the input device 10 includes a light source 59 to illuminate the hand 14 through the input element 40. While a dedicated light source 59 can be provided, such as one or more light emitting diodes (LED), among other possibilities, in some embodiments, the input device display 54 also acts as a light source.

Figure 4:
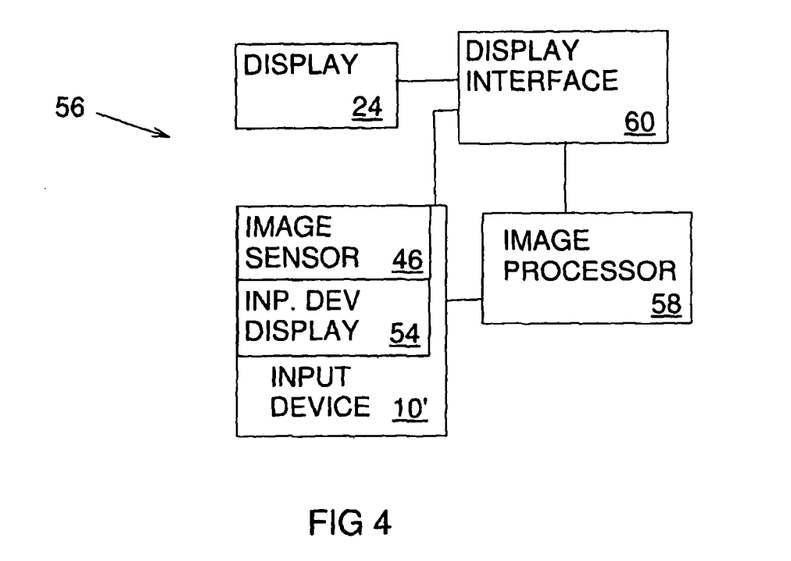
FIG. 4, in a block diagram, illustrates a system that can be embodied by the input device and computing device of FIG. 1.

In general terms, in some embodiments, the invention takes the form of a system 56 usable by an intended user having the hand 14 to operate a graphical user interface 28. Referring to FIG. 4, the system 56 includes the display 24, an input device 10' an image processor 58 and a display interface 60. The input device 10' is similar to the input device 10 and includes the input element 40 and the image sensor 46. However, for the purpose of the following paragraphs, the input device 10' does not include the image processor 50 and the input device interface 48. The image processor 50, and if required the input device interface 48, can be physically integrated in the same casing as the input device 10', or alternatively, can be provided using suitable hardware and software in a computing device, such as the computing device 12, connected to the input device 10'.

The image processor 58 is coupled to the image sensor 46 of the input device 10' and is operative for receiving the hand image from the image sensor 46 and for processing the hand image to identify the predetermined anatomical features of the hand 14 in the hand image and associate with each of the predetermined anatomical features the corresponding feature locations. A display interface 60 is coupled to the image processor 58 and to the display 24 and operative for displaying on the display 24 the various elements of the graphical user interface 28, as shown in FIG. 1, including cursors 34 associated with the predetermined anatomical features as described hereinabove.

In some embodiments, the image processor 58 is further operative for processing the hand image to derive a processed hand image 51 (seen in FIG. 1) therefrom, the processed hand image 51 preserving a shape and orientation of the hand image, and the display interface 60 is operative for overlaying on the display 24 the processed hand image 51 in a manner such that the position and orientation of the processed hand image 51 relative to the window 30 corresponds to the position and orientation of the hand 14 relative to the input surface 42. In alternative embodiments, either only the processed hand image 51 or the cursors 34 are displayed. For example, overlaying the processed hand image 51 includes mixing, in an analog manner or digitally, the processed hand image 51 with an other image in the window 30, the other image including for example parts of the graphical user interface 28.

Overlaying the processed hand image 51 can be made by mixing the hand image with the other image by for example selectively adjusting a translucence of the processed hand image 51 such that when the processed hand image 51 overlays a portion of the other image, the portion can still be seen through the processed hand image 51. In this case, the processed hand image 51 can provide feedback to the user by displaying in real time the position and shape of the hand 14 of the user on the display 24. By real time, it is meant that the delay between image acquisition and image display is so short that it is not noticeable by the user. For example, and non-limitingly, this delay is less than 33 ms.

In yet other embodiments, when the hand 14 holds a stylus 15, as seen in FIG. 1, the image processor 58 is further operative for determining the stylus end point coordinates and the display interface 60 is operative for displaying an alternative cursor 61 in the window 30. The alternative cursor 61 is positioned so that the position of the alternative cursor 61 relative to the window 30 corresponds to the location of the stylus end point 17 relative to the input surface 42. The alternative cursor 61 is different in shape, size, color or combinations thereof from the cursors 34. The embodiments allow to make a distinction between the hand 14 and the stylus 15 so that different actions in the graphical user interface 28 can be associated with the hand 14 and the stylus 15.

In yet other embodiments, the anatomical feature locations are tridimensional locations including a measure of a distance between the predetermined anatomical features and the input surface 42. For example, this distance can be determined by calibrating the input device 14 to the dimensions of the hand 14 and afterward measuring the dimension of the predetermined anatomical features, which will reduce in dimensions as they get farther from the input surface 42. Then, the cursors are configured, using shape, color or combinations thereof to indicate a distance between the input surface 42 and each of the predetermined anatomical features. In this example, additional feedback regarding the position of the hand 14 is provided to the user.

In some embodiments of the invention, the window 30 comprises dimensions substantially the same as the display 24. In other embodiments, the window 30 comprises dimensions less than the display 24.

In some embodiments, the display 24 and the input surface 42 have different spatial orientations. For example, the display 24 and the input surface 42 are substantially perpendicular to each other. In a very specific example of implementation, the display 24 is substantially vertical and the input surface 42 is substantially horizontal.

In some embodiments, the input surface 42 is contact sensitive and the input element 40 is operative for providing contact coordinates indicative of a contact location at which the hand 14 and/or stylus 15 contacts the input surface 42, the display interface 60 being operative for receiving the contact location and displaying an alternative cursor 33 in the window at an alternative cursor location. The alternative cursor 34 is positioned so that the alternative cursor location relative to the window 30 corresponds to the contact location relative to the input surface 42. The alternative cursors 33 are different in shape, size, color or combinations thereof from the other cursors 33.

Figure 5:
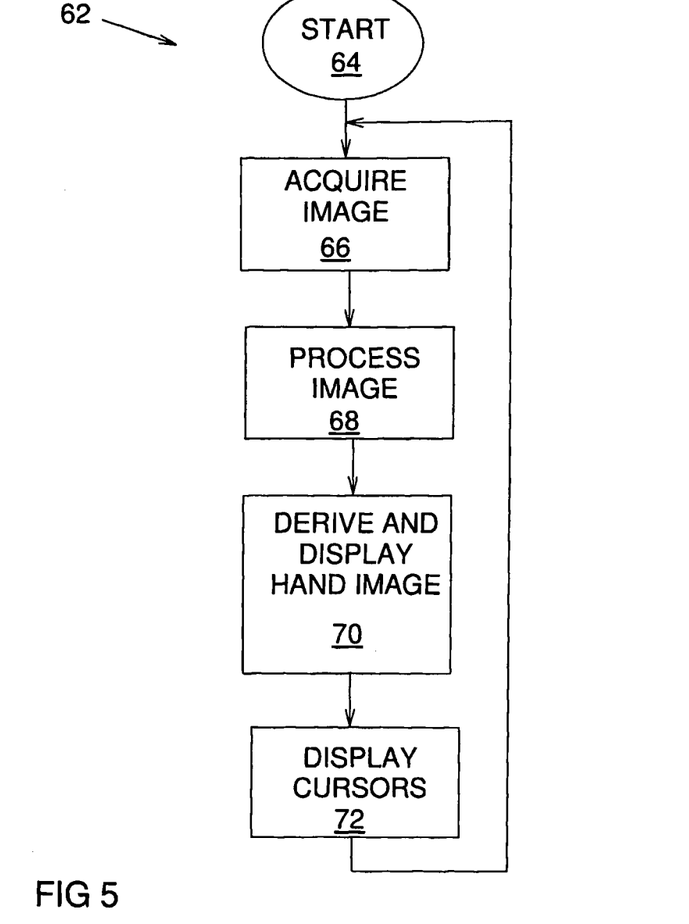
FIG. 5, in a flow chart, illustrates a method that can be performed using the system shown in FIG. 4.

The system 56 and the input device 10 in combination with the computing device 12 are usable to perform a method 62, illustrated in a flowchart in FIG. 5, for providing visual feedback to a user operating the graphical user interface 28 on the display 24. The method 62 can also be performed more generally by any suitable combination of software and hardware.

Generally speaking, the method 62 begins at step 64. Then, at step 66, with the hand 14 substantially adjacent to the input element 40, the hand image is acquired. Subsequently, at step 68, the hand image is processed to identify the predetermined anatomical features in the hand image and associate with each of the predetermined anatomical features the corresponding feature locations. Afterwards, steps 70 and 72 are performed. The order of steps 70 and 72 can be changed, or steps 70 and 72 can be performed simultaneously.

At step 70, the hand image is processed to derive a processed hand image 51, the processed hand image 51 preserving a shape and orientation of the hand 14 in the hand image, and the processed hand image 51 is overlaid on the display 24 in a manner such that the position and orientation of the processed hand image 51 relative to the window 30 corresponds to the position and orientation of the hand 14 relative to the input surface 42. At step 72, cursors 34 are displayed in the window, the cursors 34 being each associated with a corresponding one of the predetermined anatomical features, the cursors 34 being positioned so that the position of the cursors 34 relative to the window 30 corresponds to the feature locations relative to the input surface 42.

Finally, the method 62 either ends, or more typically, the method 62 is performed in a loop and restarts at step 66.

In some embodiments of the invention, the method 62 can be performed with the hand 14 entirely spaced apart from the input surface 42. In some embodiments of the invention, at least one of the anatomical features is spaced apart from the input surface 42. In some embodiments of the invention, at least one of the anatomical feature contacts the input surface 42.

In embodiments of the invention wherein the input element 40 is contact sensitive and either one of or both the hand 14 or stylus 15 contacts the input surface 42 respectively at a touch location and a stylus location. In these embodiments, the method 62 may further include detecting the touch location and displaying an alternative cursor 33 in the window 30 at an alternative cursor location, the alternative cursors being positioned so that the alternative cursor location relative to the window 30 corresponds to the touch location relative to the input surface 42. Alternatively, or in addition, the method 62 may include detecting the touch location and transmitting to the graphical user interface 28 the touch location. Then, the touch location may be used by the graphical user interface 28 to perform a predetermined action, such as for example an action associated with a "clicking" input when the graphical user interface 28 is used with a mouse. However, any other suitable action may be taken by the graphical user interface 28. Also, the method 62 may further include detecting the stylus location and displaying an alternative cursor 61 in the window 30 at an other alternative cursor location, the other alternative cursors being positioned so that the other alternative cursor location relative to the window 30 corresponds to the stylus location relative to the input surface 42.

Although the present invention has been described hereinabove by way of preferred embodiments thereof, it can be modified, without departing from the spirit and nature of the subject invention as defined in the appended claims.

What is claimed is:

1. A system usable by an intended user having a hand to operate a graphical user interface, said hand defining predetermined anatomical features, said graphical user interface including a window, said system comprising:
   a display;
   an input device, said input device including:
      an input element defining an input surface and an opposed undersurface, said input element being at least partially transparent; and
      an image sensor configured located and operative for capturing a hand image of said hand through said input element when said hand is located substantially adjacent to said input surface and either entirely spaced apart therefrom or contacting said input surface;
   an image processor coupled to said image sensor and operative for receiving said hand image from said image sensor and for processing said hand image to identify said predetermined anatomical features of said hand in said hand image and associate with each of said predetermined anatomical features a corresponding feature location, said feature locations being indicative of positions of said predetermined anatomical features relative to said input surface; and
   a display interface coupled to said image processor and to said display and operative for displaying on said display said window and displaying cursors in said window, said cursors being each associated with a corresponding ones of said predetermined anatomical features, said cursors being positioned so that the position of said cursors relative to said window corresponds to said feature locations relative to said input surface.

2. The system as defined in claim 1, wherein said image sensor includes an array of imaging elements provided substantially adjacent to said undersurface, said undersurface being provided between said image sensor and said input surface.

3. The system as defined in claim 2, wherein said hand image includes an array of pixels, each of said pixels being acquired by a respective one of said imaging elements.

4. The system as defined in claim 2, wherein said array of imaging elements and said input surface have substantially similar dimensions.

5. The system as defined in claim 2, wherein said imaging elements are near field semiconductor light detection elements.

6. The system as defined in claim 5, wherein said imaging elements are complementary metal oxide semiconductor (CMOS) imaging elements.

7. The system as defined in claim 1, wherein
   said image processor is further operative for processing said hand image to derive a processed hand image therefrom, said processed hand image preserving a shape and orientation of said hand image;
   said display interface is operative for overlaying on said display said processed hand image in a manner such that the position and orientation of said processed hand image relative to said window corresponds to the position and orientation of said hand relative to the input surface.

8. The system as defined in claim 1, wherein said display and said input surface have different spatial orientations.

9. The system as defined in claim 8, wherein said display and said input surface are substantially perpendicular to each other.

10. The system as defined in claim 9, wherein said display is substantially vertical and said input surface is substantially horizontal.

11. The system as defined in claim 1, wherein said input surface is contact sensitive and said input element is operative for providing contact coordinates indicative of a contact location at which said hand contacts said input surface, said display interface being operative for receiving said contact location and displaying an alternative cursor in said window at an alternative cursor location, said alternative cursor being positioned so that said alternative cursor location relative to said window corresponds to said contact location relative to said input surface.

12. The system as defined in claim 1 wherein said input element is contact sensitive and said hand contacts said input surface at a contact location, said input element being operative for providing contact coordinates indicative of said contact location to said graphical user interface.

13. The system as defined in claim 12, wherein said input element detects contact by a detection method selected from the group consisting of a capacitive contact detection method, a resistive contact detection method, a detection method using surface acoustic waves, an infrared contact detection method, an optical imaging contact detection method, a dispersive signal technology detection method and an acoustic pulse recognition method.

14. The system as defined in claim 1, further comprising a stylus defining a stylus end point, said stylus being graspable by said hand, said input surface being contact sensitive and said input element being operative for providing contact coordinates indicative of a contact location at which said stylus end point contacts said input surface, said display interface being operative for receiving said contact location and displaying an alternative cursor in said window at an alternative cursor location, said alternative cursor being positioned so that said alternative cursor location relative to said window corresponds to said contact location relative to said input surface.

15. The system method as defined in claim 1, further comprising a stylus defining a stylus end point, said stylus being graspable by said hand, said input element being contact sensitive for sensing a contact location at which said stylus end point contacts said input surface, said input element being further operative for providing contact coordinates indicative of said contact location to said graphical user interface.

16. The system as defined in claim 1, wherein said input device further comprises an input device display substantially in register with said input surface, said display interface being operative for displaying said window on said input device display.

17. The system as defined in claim 1, wherein said input element is entirely transparent in register with said image sensor.

18. The system as defined in claim 1, wherein said image processor is operative for classifying said predetermined anatomical features as either contacting said input element or being spaced apart therefrom.

19. The system as defined in claim 18, wherein said graphical user interface includes an object, said image processor being operative for highlighting said object if at least one of said cursors is substantially adjacent thereto, said at least one of said cursors being associated with one of said predetermined anatomical features that is spaced apart from said input surface.

20. An input device usable with a computing device by an intended user having a hand, said input device comprising: an input element defining an input surface and an opposed undersurface, said input element being at least partially transparent; an image sensor for capturing through said input element a hand image of said hand when said hand is located substantially adjacent to said input surface and either entirely spaced apart therefrom or contacting said input surface; an input device interface couplable to said computing device and operative for transmitting to said computing device image information obtained from said hand image; wherein said hand defines at least two predetermined anatomical features, said image processor being operative for receiving said hand image from said image sensor and for processing said hand image to identify said at least two predetermined anatomical features of said hand in said hand image and associate with each of said at least two predetermined anatomical features a corresponding feature location, said feature locations being indicative of a position of said at least two predetermined anatomical features relative to said input surface; and said image information includes said feature locations.

21. The input device as defined in claim 20, wherein said image information includes an unprocessed version of said hand image.

22. The input device as defined in claim 20, further comprising an image processor coupled to said image sensor and to said input device interface and operative for
receiving said hand image from said image sensor;
processing said hand image to compute said image information; and
releasing said image information to said input device interface.

23. The input device as defined in claim 22, wherein said image information includes a contour of said hand in said hand image.

24. The input device as defined in claim 22, wherein
said hand defines at least one predetermined anatomical feature, said image processor being operative for receiving said hand image from said image sensor and for processing said hand image to identify said at least one predetermined anatomical feature of said hand in said hand image and associate with said at least one predetermined anatomical features a feature location, said feature location being indicative of a position of said at least one predetermined anatomical feature relative to said input surface; and
said image information includes said feature location.

25. The input device as defined in claim 24, wherein said image processor is operative for classifying said predetermined anatomical features as either contacting said input element or being spaced apart therefrom, said image information including an indication of whether each of said predetermined anatomical feature contacts or is spaced apart from said input element.

26. The input device as defined in claim 20, wherein said image sensor includes an array of imaging elements provided substantially adjacent to said undersurface, said undersurface being provided between said image sensor and said input surface.

27. The input device as defined in claim 26, wherein said hand image includes an array of pixels, each of said pixels being acquired by a respective one of said imaging elements.

28. The input device as defined in claim 27, wherein said array of imaging elements and said input surface have substantially similar dimensions.

29. The input device as defined in claim 26, wherein said imaging elements are near field semiconductor light detection elements.

30. The input device as defined in claim 29, wherein said imaging elements are complementary metal oxide semiconductor (CMOS) imaging elements.

31. The input device as defined in claim 20, wherein said input surface is contact sensitive and said input element is operative for providing to said input device interface contact coordinates indicative of a contact location at which said hand contacts said input surface, said input device interface being operative for receiving said contact location and transmitting to said computing device said contact location.

32. The input device as defined in claim 31, wherein said contact sensitive surface detects contact by a detection method selected from the group consisting of a capacitive contact detection method, a resistive contact detection method, a detection method using surface acoustic waves, an infrared contact detection method, an optical imaging contact detection method, a dispersive signal technology detection method and an acoustic pulse recognition method.

33. The input device as defined in claim 20, wherein said input device is usable with a stylus held by said hand, said input surface being contact sensitive and said input element being operative for providing to said input device interface contact coordinates indicative of a contact location at which said stylus end point contacts said input surface, said input device interface being operative for receiving said contact location and transmitting to said computing device said contact location.

34. The input device as defined in claim 20, wherein said input device is usable with a stylus held by said hand, said input surface being contact sensitive and said input element being operative for providing to said input device interface contact coordinates indicative of contact locations at which said hand and said stylus end point contact said input surface, said input device interface being operative for receiving said contact locations and transmitting to said computing device said contact locations.

35. The input device as defined in claim 20, further comprising an input device display substantially in register with said input surface, said input device interface being operative for receiving an image from said computing device and displaying said image on said input device display.

36. The input device as defined in claim 20, wherein said input element is entirely transparent in register with said image sensor.

* * * * *